United States Patent
Kobayashi et al.

(10) Patent No.: US 9,926,764 B2
(45) Date of Patent: Mar. 27, 2018

(54) MOLDED PRODUCT HAVING EFFECTIVE THICKNESS OF 1 MM OR MORE AND CONTAINING ALIPHATIC POLYESTER RESIN, AND DOWNHOLE TOOL MEMBER FOR HYDROCARBON RESOURCE RECOVERY

(71) Applicant: Kureha Corporation, Tokyo (JP)

(72) Inventors: Takuma Kobayashi, Tokyo (JP); Hikaru Saijo, Tokyo (JP); Masayuki Okura, Tokyo (JP); Takeo Takahashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/118,210

(22) PCT Filed: Feb. 27, 2015

(86) PCT No.: PCT/JP2015/055959
§ 371 (c)(1),
(2) Date: Aug. 11, 2016

(87) PCT Pub. No.: WO2015/137168
PCT Pub. Date: Sep. 17, 2015

(65) Prior Publication Data
US 2017/0175481 A1    Jun. 22, 2017

(30) Foreign Application Priority Data
Mar. 11, 2014 (JP) ................. 2014-047564

(51) Int. Cl.
*E21B 33/12* (2006.01)
*C09K 8/88* (2006.01)
*C08K 7/16* (2006.01)

(52) U.S. Cl.
CPC ............... *E21B 33/12* (2013.01); *C08K 7/16* (2013.01); *C09K 8/88* (2013.01); *C08K 2201/003* (2013.01); *C08K 2201/016* (2013.01)

(58) Field of Classification Search
None
See application file for complete search history.

(56) References Cited

U.S. PATENT DOCUMENTS

| | | | |
|---|---|---|---|
| 4,766,167 A | 8/1988 | Marnett et al. | |
| 4,924,941 A | 5/1990 | Farley | |
| 6,409,175 B1 | 6/2002 | Evans et al. | |
| 8,887,816 B2 | 11/2014 | Liang et al. | |
| 8,899,317 B2 | 12/2014 | Frazier | |
| 2003/0060375 A1 | 5/2003 | Grainger et al. | |
| 2005/0011648 A1* | 1/2005 | Nguyen ................ | E21B 43/025 166/276 |
| 2005/0205265 A1* | 9/2005 | Todd ..................... | E21B 33/12 166/376 |
| 2005/0205266 A1 | 9/2005 | Todd et al. | |
| 2006/0113077 A1 | 6/2006 | Willberg et al. | |
| 2006/0169453 A1* | 8/2006 | Savery .................. | C04B 28/30 166/280.2 |
| 2006/0283591 A1 | 12/2006 | Willberg et al. | |
| 2007/0169935 A1 | 7/2007 | Akbar et al. | |
| 2007/0277979 A1 | 12/2007 | Todd et al. | |
| 2008/0200352 A1 | 8/2008 | Willberg et al. | |
| 2008/0224413 A1 | 9/2008 | Doane et al. | |
| 2008/0289823 A1 | 11/2008 | Willberg et al. | |
| 2009/0242214 A1 | 10/2009 | Foster et al. | |
| 2010/0132959 A1 | 6/2010 | Tinker | |
| 2010/0139930 A1 | 6/2010 | Patel et al. | |
| 2011/0067889 A1 | 3/2011 | Marya et al. | |
| 2011/0132611 A1* | 6/2011 | Rytlewski ............ | E21B 23/06 166/313 |
| 2011/0196125 A1* | 8/2011 | Wann .................... | C08L 67/04 528/354 |

(Continued)

FOREIGN PATENT DOCUMENTS

| | | |
|---|---|---|
| CA | 2868975 A1 | 12/2013 |
| CN | 1420972 A | 5/2003 |
| CN | 101273183 A | 9/2008 |
| CN | 103497386 A | 1/2014 |
| JP | H1160928 A | 3/1999 |
| JP | 2003-533619 A | 11/2003 |
| JP | 2012012560 A | 1/2012 |
| PL | 221753 B1 | 5/2016 |
| WO | 2013132002 A1 | 9/2013 |
| WO | 2013162002 A1 | 10/2013 |
| WO | WO 2013/183363 A1 | 12/2013 |
| WO | 2014010267 A1 | 1/2014 |
| WO | 2014112479 A1 | 7/2014 |

OTHER PUBLICATIONS

Notification of the First Office Action dated Jan. 26, 2017, in Chinese Patent Application No. 201580005658.4, with English translation.

(Continued)

*Primary Examiner* — Anuradha Ahuja
(74) *Attorney, Agent, or Firm* — Birch, Stewart, Kolasch & Birch, LLP

(57) ABSTRACT

Described are a molded product having an effective thickness of 1 mm or more, the molded product being formed from an aliphatic polyester resin composition containing from 1 to 30 parts by mass of a carboxylic acid anhydride and preferably further containing from 1 to 50 parts by mass of at least one type of a short fiber reinforcing material, a thermoplastic elastomer, or an acrylic rubber core-shell polymer per 100 parts by mass of an aliphatic polyester resin containing not less than 50 mass % of a polyglycolic acid resin, the effective thickness being 1 mm or more; a downhole tool for hydrocarbon resource recovery formed from the molded product having an effective thickness of 1 mm or more; an aliphatic polyester resin composition for the downhole tool member for hydrocarbon resource recovery; and a well drilling method.

2 Claims, No Drawings

(56) References Cited

U.S. PATENT DOCUMENTS

| | | |
|---|---|---|
| 2011/0277989 A1 | 11/2011 | Frazier |
| 2012/0035309 A1 | 2/2012 | Zhu et al. |
| 2012/0067581 A1 | 3/2012 | Auzerais et al. |
| 2012/0085548 A1* | 4/2012 | Fleckenstein ......... E21B 34/063 166/373 |
| 2013/0025859 A1 | 1/2013 | Liang et al. |
| 2013/0183363 A1 | 7/2013 | Polaschegg |
| 2013/0233546 A1 | 9/2013 | Liang et al. |
| 2013/0237637 A1 | 9/2013 | Katou et al. |
| 2013/0240203 A1 | 9/2013 | Frazier |
| 2013/0292123 A1 | 11/2013 | Murphree et al. |
| 2014/0190685 A1 | 7/2014 | Frazier et al. |
| 2015/0051119 A1 | 2/2015 | Masaki et al. |
| 2015/0096741 A1 | 4/2015 | Okura et al. |
| 2015/0292292 A1 | 10/2015 | Okura et al. |
| 2015/0361326 A1 | 12/2015 | Masaki et al. |
| 2016/0108696 A1 | 4/2016 | Okura et al. |

OTHER PUBLICATIONS

International Search Report of PCT/JP2015/055959 dated May 19, 2015.
Decision of Rejection dated Oct. 23, 2017, in Chinese Patent Application No. 201580005658.4, with English translation.
Chinese Office Action for Chinese Application No. 201580005658.4, dated Jun. 29, 2017, with an English translation.
Canadian Office Action, dated Mar. 22, 2017, for Canadian Application No. 2,931,349.
Chinese Office Action and Search Report, dated, Jun. 8, 2017, for Chinese Application No. 201480055144.5, along with English translations.
Database WPI, Week 201418, Thomson Scientific, London, GB; AN 2014-E36537; XP002767496 (CN 103 497 386 A, Jan. 8, 2014, Abstract).
Database WPI, Week 201442, Thomson Scientific, London, GB; AN 2014-L91484; XP002767495 (PL 399 156 A1, Nov. 25, 2013, Abstract).
English translation of the International Search Report (form PCT/ISA/210), dated Mar. 31, 2015, for International Application No. PCT/JP2014/084045.
English translation of the International Search Report (form PCT/ISA/210), dated May 26, 2015, for International Application No. PCT/JP2015/056419.
Extended European Search Report and Supplementary European Search Report, dated Mar. 3, 2017, for European Patent Application No. 15757709.9.
International Preliminary Report on Patentability and English translation of the Written Opinion of the International Searching Authority (forms PCT/IB/373, PCT/ISA/237 and PCT/IB/338), dated Jul. 7, 2016, for International Application No. PCT/JP2014/084045.
International Preliminary Report on Patentability and English translation of the Written Opinion of the International Searching Authority (forms PCT/IB/373, PCT/ISA/237 and PCT/IB/338), dated Sep. 22, 2016, for International Application No. PCT/JP2015/056419.
Non-Final Office Action dated Oct. 10, 2017, in copending U.S. Appl. No. 15/123,857.
Canadian Office Action and Search Report, dated Dec. 8, 2017, for Canadian Application No. 2,931,349.
Notification of Reasons for Rejection dated Dec. 26, 2017, in Japanese Patent Application No. 2014-047564, with English translation.
Notification of Reasons for Rejection dated Jan. 9, 2018, in Japanese Patent Application No. 2014-127561, with English translation.

* cited by examiner

MOLDED PRODUCT HAVING EFFECTIVE THICKNESS OF 1 MM OR MORE AND CONTAINING ALIPHATIC POLYESTER RESIN, AND DOWNHOLE TOOL MEMBER FOR HYDROCARBON RESOURCE RECOVERY

TECHNICAL FIELD

The present invention relates to a molded product containing an aliphatic polyester resin, a carboxylic acid anhydride, and, if desired, a short-fiber reinforcing material; and a downhole tool member for hydrocarbon resource recovery. More particularly, the present invention relates to a molded product having an effective thickness of 1 mm or more, the molded product being formed from an aliphatic polyester resin composition containing a polyglycolic acid resin as a primary component; and a downhole tool member for hydrocarbon resource recovery.

BACKGROUND ART

Since aliphatic polyester resins such as polyglycolic acid resins (sometimes called a "PGA" hereafter) or polylactic acid resins (sometimes called "PLA" hereafter) are degraded by microorganisms or enzymes existing in the natural world such as in soil or in oceans, attention has been focused on these resins as biodegradable polymer materials with a small burden on the environment. In addition to the biodegradability, these aliphatic polyesters have hydrolyzability and use of the aliphatic polyesters in various fields has been actively investigated in recent years.

Among aliphatic polyester resins, a PGA has excellent mechanical strength as well as excellent gas barrier properties such as oxygen gas barrier properties, carbonic acid gas barrier properties, and water vapor barrier properties or aroma barrier properties. Since a PGA is a heat-resistant material which has a high melting point and can be melt-molded, the applications of PGA as a biodegradable and hydrolyzable resin with excellent practicability are expanding, either with PGA alone or as a composite with other resin materials or the like. PGA is used as a molding material for forming molded products by means of general-purpose resin molding methods such as injection molding, extrusion molding (including solidification- and extrusion-molding), compression molding, and blow molding. For example, PGA is used as a material for forming molded products (specifically, film molded products or the like) such as packaging materials for food products or the like which are susceptible to oxidative degradation, or easily compostable packaging materials having a small environmental burden.

Furthermore, a PGA is increasingly anticipated as a downhole tool member for hydrocarbon resource recovery that is, a downhole tool member for hydrocarbon resource recovery (also simply called a "downhole tool member" hereafter) which can be left underground and degraded after use by taking advantage of the strength and degradability (biodegradability and hydrolyzability) of the PGA.

In order to recover hydrocarbon resources such as petroleum (including shale oil) or natural gas (including shale gas) from underground, a downhole for forming a well such as an oil well or a gas well is provided. Drilling includes, for example, the operation of expanding the amount of petroleum or natural gas produced by forming a shaft by drilling into the subterranean formation with a drill while circulating mud water and generating holes or cracks in the productive layer by using a tool containing gunpowder such as a perforation gun or by injecting fracturing fluid into the subterranean formation at a high pressure (fracturing). In order to form or repair a downhole, a tool such as a frac plug, a bridge plug, a cement retainer, a perforation gun, a ball sealer, an isolation plug, or a packer—that is, a downhole tool for hydrocarbon resource recovery (also simply called a "downhole tool" hereafter) is used, ordinarily in plurality, and disposed inside the downhole. Rather than being retrieved to the ground after use, the downhole tool has often been disposed by disintegrating or dropping the tool directly inside the downhole. Therefore, a member constituting the entire downhole tool or a coupling site for promoting disintegration (corresponding to a downhole tool member) is formed from a degradable material such as a degradable polymer (Patent Documents 1, 2, and the like). Examples of degradable polymers include polysaccharides such as starch and dextrin; animal proteins such as chitin and chitosan; aliphatic polyesters such as PLA (a typical example of which is poly-L-lactic acid (PLLA)), PGA, polybutyric acid, and polyvaleric acid; polyamino acids, and polyethylene oxide.

As the depth of well drilling increase, the temperature and pressure of the downhole environment become increasingly high. There are increasing expectations for PGA, which has excellent mechanical strength, degradability, and heat resistance under temperature conditions of, for example, 66° C. (equivalent to 150° F.), 80° C., 93° C., 121° C., and 149° C. (equivalent to 300° F.) as well as temperatures near 200° C. That is, PGA has excellent degradability and can degrade in a desired short period of time, even in the form of a molded product having a large effective thickness (referring to the maximum thickness or maximum diameter of the molded product).

On the other hand, as well drilling becomes increasingly diverse, downhole environments with lower temperature conditions than temperature conditions of conventional environments have emerged. It is desired that PGA, which has excellent degradability in downhole environments with a temperature of 66° C. or higher, for example, will also have excellent degradability and can be degraded in a desired short amount of time even in relatively low-temperature downhole environments such as a temperature of lower than 66° C. That is, a molded product having a small effective thickness (which is equivalent to a small thickness or a small diameter) can be degraded in a short amount of time, but there have been hopes for a molded product having an effective thickness of 1 mm or more such as a downhole tool member, for example, which can also be degraded in a desired short period of time.

The present inventors proposes a polyester resin composition containing 100 parts by mass of a polyester resin containing not less than 50 mass % of a glycolic acid resin and from 0.5 to 50 parts by mass of a carboxylic acid anhydride as a polyester resin composition for forming a molded article of a shape such as a powder, a pellet, a film, or a fiber to be compounded and used in a well treatment fluid such as a fracturing fluid (Patent Document 3). In Patent Document 3, a powder having a major/minor axis ratio of not greater than 1.9 and a cumulative 50 wt. % average diameter of 1 to 1,000 μm, a pellet having a length of 1 to 10 mm in the longitudinal direction and an aspect ratio of not less than 1 and less than 5, a film having an area of 0.01 to 10 cm² and a thickness of 1 to 1,000 μm, and a short fiber having a length/cross-sectional diameter ratio (aspect ratio) of 10 to 2,000 and a minor axis of 5 to 95 μm are given as examples of molded articles. Patent Document 3 discloses that these fibers are contained in a fracturing fluid at a concentration of 0.05 to 100 g/L and preferably from 0.1 to 50 g/L. However, there is no suggestion in Patent Document 3 of a molded product having an effective thickness of 1 mm or more such as a downhole tool member.

Therefore, there has been a demand for a molded product containing an aliphatic polyester resin, which is a degradable material, and having an effective thickness of 1 mm or more, having excellent degradability even in relatively low-temperature downhole environments such as a temperature of lower than 66° C., for example, so as to be degradable in a desired short amount of time, and having sufficient mechanical strength.

CITATION LIST

Patent Literature

Patent Document 1: U.S. Patent Application Publication No. 2005/0205265 A1 Specification
Patent Document 2: U.S. Patent Application Publication No. 2005/0205266 A1 Specification
Patent Document 3: WO/2013/132002

SUMMARY OF INVENTION

Technical Problem

Therefore, an object of the present invention is to provide a molded product containing an aliphatic polyester resin, which is a degradable material, and having an effective thickness of 1 mm or more, having excellent degradability even in relatively low-temperature downhole environments such as a temperature of lower than 66° C., for example, so as to be degradable in a desired short amount of time, and having sufficient mechanical strength.

Solution to Problem

As a result of conducting dedicated research in order to achieve the object described above, the present inventors discovered that the problems described above can be solved by forming a molded product containing an aliphatic polyester resin, which is a degradable material, and having an effective thickness of 1 mm or more, from an aliphatic polyester resin composition containing a specific amount of a carboxylic acid anhydride, thereby completing the present invention.

That is, the present invention provides a molded product having an effective thickness of 1 mm or more, the molded product being formed from an aliphatic polyester resin composition containing from 1 to 30 parts by mass of a carboxylic acid anhydride per 100 parts by mass of an aliphatic polyester resin containing not less than 50 mass % of a polyglycolic acid resin, the effective thickness being 1 mm or more.

The present invention further provides molded products having an effective thickness of 1 mm or more according to (1) to (8) below as specific modes of the invention.

(1) The aforementioned molded product having an effective thickness of 1 mm or more, wherein the lead time until degradation begins when immersed in water at a temperature of 60° C. is not more than 40 hours.
(2) The aforementioned molded product having an effective thickness of 1 mm or more, wherein the carboxylic acid anhydride contains at least one type selected from the group consisting of aliphatic monocarboxylic acid anhydrides, aromatic monocarboxylic acid anhydrides, aliphatic dicarboxylic acid anhydrides, aromatic dicarboxylic acid anhydrides, aromatic tricarboxylic acid anhydrides, alicyclic dicarboxylic acid anhydrides, aliphatic tetracarboxylic acid dianhydrides, and aromatic tetracarboxylic acid dianhydrides.
(3) The aforementioned molded product having an effective thickness of 1 mm or more, wherein the molded product contains from 1 to 50 parts by mass of at least one type selected from the group consisting of a short fiber reinforcing material, a thermoplastic elastomer, and an acrylic rubber core-shell polymer per 100 parts by mass of an aliphatic polyester resin containing not less than 50 mass % of a polyglycolic acid resin.
(4) The aforementioned molded product having an effective thickness of 1 mm or more, wherein the short fiber reinforcing material has a diameter of 0.1 to 1,000 µm and an aspect ratio of 2 to 1,000.
(5) The aforementioned molded product having an effective thickness of 1 mm or more, wherein the short fiber reinforcing material contains at least one type selected from the group consisting of glass fibers, carbon fibers, and aramid fibers.
(6) The aforementioned molded product having an effective thickness of 1 mm or more, wherein the short fiber reinforcing material is bundled with a sizing agent.
(7) The aforementioned molded product having an effective thickness of 1 mm or more, wherein the thermoplastic elastomer is a thermoplastic polyester elastomer.
(8) The aforementioned molded product having an effective thickness of 1 mm or more, wherein the acrylic rubber core-shell polymer is an acrylic rubber-containing core-shell (meth)acrylate (co)polymer.

In addition, the present invention provides a downhole tool member for hydrocarbon resource recovery formed from the aforementioned molded product having an effective thickness of 1 mm or more, and more particularly, a downhole tool member for hydrocarbon resource recovery in the form of at least one type selected from the group consisting of an annular member, a ball, a ball seat, and a screw.

Furthermore, the present invention provides an aliphatic polyester resin composition for the aforementioned downhole tool member for hydrocarbon resource recovery containing from 1 to 30 parts by mass of a carboxylic acid anhydride per 100 parts by mass of an aliphatic polyester resin containing not less than 50 mass % of a polyglycolic acid resin. The present invention further provides an aliphatic polyester resin composition for the aforementioned downhole tool member for hydrocarbon resource recovery containing from 1 to 50 parts by mass of at least one type selected from a short fiber reinforcing material, a thermoplastic elastomer, and an acrylic rubber core-shell polymer per 100 parts by mass of an aliphatic polyester resin containing not less than 50 mass % of a polyglycolic acid resin. The present invention also provides a well drilling method of performing well treatment using the aforementioned downhole tool member for hydrocarbon resource recovery, and degrading the downhole tool member for hydrocarbon resource recovery.

Advantageous Effects of Invention

By providing the aforementioned molded product having an effective thickness of 1 mm or more, the molded product being formed from an aliphatic polyester resin composition containing from 1 to 30 parts by mass of a carboxylic acid anhydride per 100 parts by mass of an aliphatic polyester resin containing not less than 50 mass % of a polyglycolic acid resin, the effective thickness being 1 mm or more, the present invention has the effect of providing a molded product containing an aliphatic polyester, which is a degradable material, and having an effective thickness of 1 mm or more, having excellent degradability even in relatively low-temperature downhole environments such as a temperature of lower than 66° C., for example, so as to be degradable in a desired short amount of time, and having sufficient mechanical strength.

In addition, by providing a downhole tool member for hydrocarbon resource recovery formed from the aforementioned molded product having an effective thickness of 1 mm or more, the present invention has the effect of providing a downhole tool member for hydrocarbon resource recovery having excellent degradability even in relatively low-temperature downhole environments such as a temperature of lower than 66° C., for example, so as to be degradable in a desired short amount of time, and having sufficient mechanical strength.

In addition, by providing an aliphatic polyester resin composition for the aforementioned downhole tool member for hydrocarbon resource recovery containing from 1 to 30 parts by mass of a carboxylic acid anhydride per 100 parts by mass of an aliphatic polyester resin containing not less than 50 mass % of a polyglycolic acid resin, the present invention has the effect of providing an aliphatic polyester resin composition for a downhole tool member for hydrocarbon resource recovery having excellent degradability even in relatively low-temperature downhole environments such as a temperature of lower than 66° C., for example, so as to be degradable in a desired short amount of time, and having sufficient mechanical strength. Furthermore, the present invention provides a well drilling method using the aforementioned downhole tool member for hydrocarbon resource recovery, the downhole tool member for hydrocarbon resource recovery being degraded after well treatment, and a downhole tool member formed from a molded product having sufficient mechanical strength. Due to these features, well treatment such as fracturing can be performed reliably, and the molded product has excellent degradability even in relatively low-temperature downhole environments such as a temperature of lower than 66° C. and can be degraded in a desired short amount of time. Therefore, the present invention has the effect of providing an efficient and economical well drilling method.

DESCRIPTION OF EMBODIMENTS

I. Aliphatic Polyester Resin Composition

The molded product having an effective thickness of 1 mm or more according to the present invention is formed from an aliphatic polyester resin composition containing from 1 to 30 parts by mass of a carboxylic acid anhydride per 100 parts by mass of an aliphatic polyester resin containing not less than 50 mass % of a polyglycolic acid resin.

1. Aliphatic Polyester Resin

The aliphatic polyester resin contained in the aliphatic polyester resin composition forming the molded product of the present invention having an effective thickness of 1 mm or more is an aliphatic polyester resin containing not less than 50 mass % of a polyglycolic acid resin.

(1) Polyglycolic Acid Resin

A polyglycolic acid resin (also called a "PGA" hereafter) is a polymer having glycolic acid repeating units represented by the formula (—O—CH2—CO—). In addition to a polyglycolic acid homopolymer, which is a homopolymer of a glycolic acid comprising glycolic acid repeating units, a PGA also refers to a polyglycolic acid copolymer (also called a "PGA copolymer" hereafter) containing not less than 50 mass % of glycolic acid repeating units. A PGA can be synthesized by dehydrative polycondensation of a glycolic acid serving as an α-hydroxycarboxylic acid alone or together with other monomers (also called "comonomers" hereafter). In order to efficiently synthesize a high-molecular weight PGA, which is anticipated to form molded products having excellent mechanical strength, synthesis is performed through the ring-opening polymerization of a glycolide, which is a bimolecular cyclic ester of glycolic acid.

Examples of comonomers that can be used to synthesize a PGA copolymer together with glycolic acids and/or glycolides, which are bimolecular cyclic esters thereof include polyol compounds such as ethylene glycol, propylene glycol, butanediol, heptanediol, hexanediol, octanediol, nonanediol, decanediol, 1,4-cyclohexane dimethanol, neopentyl glycol, glycerin, pentaerythritol, bisphenol A, polyethylene glycol, polypropylene glycol, and polytetramethylene glycol; dicarboxylic acids such as oxalic acid, adipic acid, sebacic acid, azelaic acid, dodecanedioic acid, malonic acid glutaric acid, cyclohexane dicarboxylic acid, terephthalic acid, isophthalic acid, phthalic acid, naphthalene dicarboxylic acid, bis(p-carboxyphenyl)methane, anthracene dicarboxylic acid, 4,4'-diphenyl ether dicarboxylic acid, 5-sodium sulfoisophthalic acid, and 5-tetrabutyl phosphonium isophthalic acid; hydroxycarboxylic acids such as lactic acid, hydroxypropionic acid, hydroxybutyric acid, hydroxyvaleric acid, hydroxycaproic acid, and hydroxybenzoic acid; lactides; lactones such as β-propiolactone, β-butyrolactone, β-pivalolactone, γ-butyrolactone, δ-valerolactone, β-methyl-δ-valerolactone, and ε-caprolactone; carbonates such as trimethylene carbonate; ethers such as 1,3-dioxane; ether esters such as dioxanone; amides such as ε-caprolactam; substantially equimolar mixtures of aliphatic diols such as ethylene glycol and 1,4-butanediol and aliphatic dicarboxylic acids such as succinic acid and adipic acid or alkyl esters thereof; or two or more types thereof. Polymers of these comonomers can be used as starting raw materials for providing a PGA copolymer together with glycolic acid monomers. When a PGA is synthesized using a glycolide as a glycolic acid monomer, or using a glycolide together with a glycolic acid as desired, a cyclic monomer is preferably used as a comonomer. For example, bimolecular cyclic esters of hydroxycarboxylic acids other than lactides, which are bimolecular cyclic esters of lactic acids, lactones, or the like can be used.

The ratio of the glycolic acid repeating units in the PGA is preferably not less than 80 mass%, more preferably not less than 90 mass %, even more preferably not less than 95 mass %, particularly preferably not less than 98 mass %, and most preferably not less than 99 mass %, and the PGA may be a polyglycolic acid homopolymer in which the ratio of glycolic acid repeating units is 100 mass %. The ratio of units originating from comonomers in the PGA is ordinarily not more than 50 mass %, preferably not more than 20 mass %, more preferably not more than 10 mass %, even more preferably not more than 5 mass %, particularly preferably not more than 2 mass %, and most preferably not more than 1 mass %, and the PGA may also be a substance that does not contain any comonomers whatsoever.

Weight average molecular weight (Mw)

The weight average molecular weight (Mw) of the PGA is typically preferably in a range of 70,000 to 1,000,000, more preferably in a range of 100,000 to 800,000, even more preferably in a range of 120,000 to 500,000, and particularly preferably in a range of 150,000 to 400,000. The weight average molecular weight (Mw) of the PGA is determined using a gel permeation chromatography (GPC) apparatus. When the weight average molecular weight (Mw) is too small, mechanical properties such as heat resistance or strength may be insufficient, or degradation may progress quickly, which may make it difficult to achieve the purpose of the present invention. When the weight average molecular weight (Mw) is too large, it may become difficult to mold a molded product, or the prescribed degradation may not occur within the desired period of time due to insufficient degradability.

Melting Point (Tm)

The melting point (Tm) of the PGA is typically from 185 to 245° C. and can be adjusted based on the weight average molecular weight (Mw), the molecular weight distribution, the types and content ratios of copolymerization components, and the like. The melting point (Tm) of the PGA is preferably from 190 to 240° C., more preferably from 195 to 235° C., and particularly preferably from 200 to 230° C. The melting point (Tm) of a polyglycolic acid homopolymer is typically around 220° C. When the melting point (Tm) is too low, mechanical characteristics such as the heat resistance or the strength may be insufficient. When the melting point (Tm) is too high, the moldability of the molded product may be insufficient, or the degradation of the PGA, the carboxylic acid anhydride, or other blended components contained in the aliphatic polyester resin composition may occur. The melting point (Tm) of the PGA is determined in a nitrogen atmosphere using a differential scanning calorimeter (DSC).

(2) Aliphatic Polyester Resin Containing Not Less Than 50 Mass % of a Polyglycolic Acid Resin The aliphatic polyester resin contained in the aliphatic polyester resin composition forming the molded product of the present invention having an effective thickness of 1 mm or more is an aliphatic polyester resin containing not less than 50 mass % of a PGA. The ratio of the PGA in the aliphatic polyester resin is preferably not less than 70 mass %, more preferably not less than 80 mass %, even more preferably not less than 90 mass %, and particularly preferably not less than 95 mass % from the perspective of enhancing the degradability of the aliphatic polyester resin composition, and the resin may also be an aliphatic polyester resin containing 100 mass % of a PGA—that is, an aliphatic polyester resin containing only a PGA.

The aliphatic polyester resin may contain aliphatic polyester resins other than a PGA at a ratio of not greater than 50 mass %. The ratio of other aliphatic polyester resins is preferably not greater than 30 mass %, more preferably not greater than 20 mass %, even more preferably not greater than 10 mass %, and particularly preferably not greater than 5 mass %. The other aliphatic polyester resins are not particularly limited, but examples thereof include degradable aliphatic polyester resins such as polylactic acid (PLA), polycaprolatone, polyhydroxybutyrate, polyhydroxyvalerate, polyhydroxycaproate, polyhydroxyheptanoate, poly(hydroxybutyrate/hydroxyvalerate), polyethylene succinate, polybutylene succinate, and polybutylene succinate adipate. One type of these degradable aliphatic polyester resins may be used alone, or two or more types may be used in combination. Lactic acid resins are preferable as degradable aliphatic polyester resins from the perspective of enhancing the degradability of the aliphatic polyester resin composition. Polylactic acids (poly-L-lactic acid (PLLA), stereocomplex-type polylactic acid (SCPLA), or the like) are preferable as lactic acid resins.

2. Carboxylic Acid Anhydride

The molded product having an effective thickness of 1 mm or more according to the present invention is formed from an aliphatic polyester resin composition containing from 1 to 30 parts by mass of a carboxylic acid anhydride per 100 parts by mass of the aliphatic polyester resin described above.

The carboxylic acid anhydride is not particularly limited; however, from the perspective of heat resistance that can tolerate the molding temperature at which the aliphatic polyester resin composition is molded in order to form a molded product having an effective thickness of 1 mm or more, and from the perspective of compatibility with the aliphatic polyester resin, the carboxylic acid anhydride is preferably an aliphatic monocarboxylic acid anhydride (preferably an aliphatic monocarboxylic acid anhydride having two alkyl groups having from 6 to 20 carbons) such as a hexanoic acid anhydride, an octanoic acid anhydride, a decanoic acid anhydride, a lauric acid anhydride, a myristic acid anhydride, a palmitic acid anhydride, and a stearic acid anhydride; an aromatic monocarboxylic acid anhydride such as a benzoic acid anhydride; an aliphatic dicarboxylic acid anhydride (preferably an aliphatic dicarboxylic acid anhydride having a saturated or unsaturated hydrocarbon chain having from 2 to 20 carbons) such as a succinic acid anhydride and a maleic acid anhydride; an aromatic dicarboxylic acid anhydride such as a phthalic anhydride; an aromatic tricarboxylic acid anhydride such as a trimellitic acid anhydride; an alicyclic dicarboxylic acid anhydride such as a tetrahydrophthalic anhydride; an aliphatic tetracarboxylic dianhydride such as a butanetetracarboxylic dianhydride; or an aromatic tetracarboxylic dianhydride such as a 3,3',4,4'-benzophenone tetracarboxylic dianhydride, a diphenylsulfone tetracarboxylic dianhydride, a biphenyl tetracarboxylic dianhydride, ethyleneglycol bisanhydrotrimellitate, and glycerin bisanhydrotrimellitate monoacetate. That is, the carboxylic acid anhydride preferably contains at least one type selected from these groups. Carboxylic acid anhydrides having a cyclic structure are more preferable; aromatic monocarboxylic acid anhydrides, aromatic dicarboxylic acid anhydrides, aromatic tricarboxylic acid anhydrides, and aromatic tetracarboxylic acid dianhydrides are even more preferable; and phthalic anhydride, trimellitic anhydride, and 3,3',4,4'-benzophenone-tetracarboxylic dianhydride (also called "BTDA" hereafter) are particularly preferable from the perspective of molding processability. One type of these carboxylic acid anhydrides may be used alone or two or more types of these carboxylic acid anhydrides may be used in combination.

The aliphatic polyester resin composition forming the molded product of the present invention having an effective thickness of 1 mm or more contains from 1 to 30 parts by mass of a carboxylic acid anhydride per 100 parts by mass of an aliphatic polyester resin. This allows a molded product to have excellent degradability even in relatively low-temperature downhole environments such as a temperature of lower than 66° C., for example, so as to be degradable in a desired short amount of time, and having sufficient mechanical strength. When the content of the carboxylic acid anhydride is too small, the degradability in a molded product having an effective thickness of 1 mm or more may not be expressed sufficiently in low-temperature environments such as a temperature of lower than 66° C. When the content of the carboxylic acid anhydride is too large, the molding processability of the aliphatic polyester resin composition is diminished. In addition, the content of the carboxylic acid anhydride is preferably from 1.5 to 25 parts by mass and more preferably from 2 to 20 parts by mass per 100 parts by mass of the aliphatic polyester resin.

3. At least one type selected from the group consisting of a short fiber reinforcing material, a thermoplastic elastomer, and an acrylic rubber core-shell polymer The molded product having an effective thickness of 1 mm or more according to the present invention contains from 1 to 30 parts by mass of a carboxylic acid anhydride and contains from 1 to 50 parts by mass of at least one type selected from the group consisting of a short fiber reinforcing material, a thermoplastic elastomer, and an acrylic rubber core-shell polymer per 100 parts by mass of an aliphatic polyester resin. This allows a molded product to have an effective thickness of 1 mm or more and having excellent mechanical properties as well as better degradability in relatively low-temperature downhole environments. One type of the short fiber reinforcing material, thermoplastic elastomer, or acrylic rubber core-shell polymer may be used alone, or two or more types may be used in combination. For example, a short fiber reinforcing material and a thermoplastic elastomer may be used in combination, or a short fiber reinforcing material and an acrylic rubber core-shell polymer may be used in combination.

3-1. Short Fiber Reinforcing Material

An inorganic short fiber reinforcing material or an organic short fiber reinforcing material may be used as a short fiber reinforcing material. The short fiber reinforcing material is not particularly limited and may also be a so-called whisker-like reinforcing material. Preferable examples include inorganic short fiber reinforcing materials such as glass fibers (chopped strands, milled fibers, or the like), carbon fibers (PAN-type or pitch-type), boron fibers, aluminum fibers, zirconia fibers, ceramic fibers, asbestos fibers, gypsum fibers, silicon carbide fibers, silica fibers, titanium oxide fibers, potassium titanate whiskers, barium titanate whiskers, aluminum borate whiskers, silicon nitride whiskers, zinc oxide whiskers, calcium carbonate whiskers, wollastonite whiskers, and aluminum borate whiskers; and organic short fiber reinforcing materials such as aramid fibers, liquid crystal polymer fibers, and cellulose fibers (kenaf fibers). The short fiber reinforcing material more preferably contains at least one type selected from the group consisting of glass fibers, carbon fibers, and aramid fibers.

The diameter (D) of the short fiber reinforcing material is preferably from 0.1 to 1,000 µm, more preferably from 1 to 100 µm, and particularly preferably from 5 to 20 µm, and the aspect ratio (L/D) is preferably from 2 to 1,000, more preferably from 3 to 500, and particularly preferably from 3 to 200. Ordinarily, a short fiber reinforcing material called a milled fiber or chopped fiber is preferably used. Note that, L is the length (unit: µm) of the short fiber reinforcing material. The diameter (D) and the length (L) refer to values for the short fiber reinforcing material in the molded product and are ordinarily measured for the short fiber reinforcing material after melt-kneading. When the diameter (D) is less than 0.1 µm, the mechanical strength of the molded product having an effective thickness of 1 mm or more may be insufficient, and when the diameter (D) exceeds 1,000 µm, the uniformity of the degradation behavior of the molded product having an effective thickness of 1 mm or more may be lost. When the aspect ratio (L/D) is less than 2, the mechanical strength of the molded product having an effective thickness of 1 mm or more may be insufficient, and when the aspect ratio (L/D) exceeds 1,000, it may be difficult to uniformly disperse the short fiber reinforcing material in the aliphatic polyester resin by melt-kneading at the time of molding. Typically, when the aspect ratio (L/D) increases, a trend in which the time until the degradation of the molded product having an effective thickness of 1 mm or more begins in a downhole environment (also called the "lead time" or "initial suppression period" hereafter) increases is observed, so fluctuations in the lead time can be controlled to a certain degree by adjusting the aspect ratio (L/D).

The short fiber reinforcing material may also be bundled with a sizing agent for the purpose of enhancing the handleability of the short fiber reinforcing material or for the purpose of increasing the mechanical strength of the molded product having an effective thickness of 1 mm or more that is formed. A sizing agent selected from one or two or more types of sizing agents which are themselves conventionally known such as epoxy resins, urethane resins, acrylic resins, silane coupling agents, and vinyl acetate resins can be used as a sizing agent, but an epoxy resin sizing agent is preferably used alone or as a mixture with another sizing agent from the perspective of strength enhancing effect and the molecular weight maintaining effect on the aliphatic polyester resin. An example of a particularly preferable combination is a combination of glass fibers and an epoxy resin sizing agent or a combination of carbon fibers and an epoxy resin sizing agent. When a sizing agent is used, the amount of the sizing agent that is used is preferably from 0.1 to 10 mass % and more preferably from 0.3 to 5 mass % of the entire short fiber reinforcing material that is bundled.

The short fiber reinforcing material is preferably contained in an amount of 1 to 50 parts by mass, more preferably from 5 to 45 parts by mass, and even more preferably from 10 to 40 parts by mass per 100 parts by mass of the aliphatic polyester resin. When the content of the short fiber reinforcing material is less than 1 part by mass, the mechanical strength of the molded product having an effective thickness of 1 mm or more may be insufficient, and when the content exceeds 50 parts by mass, it may be difficult to uniformly disperse the short fiber reinforcing material in the aliphatic polyester resin by melt-kneading at the time of molding. When the content of the short fiber reinforcing material increases, a trend in which the lead time increases is observed, and fluctuations in the lead time can be controlled by combining the aspect ratio described above.

3-2. Thermoplastic Elastomer

Examples of thermoplastic elastomers include polyester thermoplastic elastomers (also called "thermoplastic polyester elastomers" hereafter) or polyurethane thermoplastic elastomers, and thermoplastic polyester elastomers are more preferable from the perspective of compatibility with the aliphatic polyester resin. Examples of thermoplastic polyester elastomers include block copolymers containing an aromatic polyester unit such as polybutylene terephthalate as a hard segment and containing an aliphatic polyether unit as a soft segment (that is, polyester/polyether block copolymers) and block copolymers containing an aliphatic polyester unit as a soft segment (that is, aromatic polyester/aliphatic polyester block copolymers), but polyester/polyether block copolymers are even more preferable. One type of a thermoplastic elastomer may be used alone, or two or more types may be used in combination. A thermoplastic polyester elastomer, which is a preferable thermoplastic elastomer, can be obtained as a commercially available product such as Hytrel (registered trademark) or the like manufactured by Du Pont-Toray Co., Ltd.

The thermoplastic elastomer is preferably contained in an amount of 1 to 50 parts by mass, more preferably from 1.5 to 30 parts by mass, and even more preferably from 2 to 20 parts by mass per 100 parts by mass of the aliphatic polyester resin. When the content of the thermoplastic elastomer is less than 1 part by mass, it may not be possible to maintain a good balance of the mechanical properties of the molded product having an effective thickness of 1 mm or more, whereas when the content exceeds 50 parts by mass, it may be difficult to uniformly disperse the thermoplastic elastomer in the aliphatic polyester resin by melt-kneading at the time of molding, and as a result, the mechanical properties of the molded product having an effective thickness of 1 mm or more may be diminished.

3-3. Acrylic Rubber Core-Shell Polymer

An acrylic rubber core-shell polymer is a core-shell polymer comprising an acrylic rubber as a core layer and a vinyl (co)polymer as a shell layer. A rubber (also called an "elastomer") obtained by polymerizing an acrylic acid ester such as butyl acrylate and a small amount of a crosslinkable and/or graft-forming monomer such as butylene diacrylate may be used as the acrylic rubber forming the core layer. In addition to butyl acrylate, examples of the acrylic esters include methyl acrylate, ethyl acrylate, propyl acrylate, n-hexyl acrylate, n-octyl acrylate, and 2-ethylhexyl acrylate. Examples of crosslinkable and/or graft-forming monomers include vinyl compounds such as divinyl benzene, butylene diacrylate, butylene dimethacrylate, ethylene glycol diacrylate, ethylene glycol dimethacrylate, butylene glycol diacrylate, butylene glycol dimethacrylate, trimethylol propane diacrylate, and trimethylol propane dimethacrylate, and allyl compounds such as allyl acrylate, all methacrylate, diallyl maleate, diallyl fumarate, diallyl itaconate, monoallyl maleate, monoallyl fumarate, and triallyl cyanurate. Divinyl benzene, butylene diacrylate, and allyl acrylate, and the like are particularly preferable. The acrylic rubber may be a silicone acrylic rubber. Examples of silicone acrylic rubbers include polyorganosiloxane/acrylic composite rubbers or the like containing a silicone rubber component such as a polyorganosiloxane rubber and a component comprising the acrylic rubber described above.

The vinyl (co)polymer forming the shell layer of an acrylic rubber core-shell polymer is formed from a vinyl monomer. Examples of the vinyl monomers include unsaturated carboxylic acid ester monomers, unsaturated dicarboxylic acid anhydride monomers, unsaturated tricarboxylic acid anhydride monomers, aliphatic vinyl monomers, aromatic vinyl monomers, vinyl cyanide monomers, maleimide monomers, unsaturated monocarboxylic acid monomers, unsaturated dicarboxylic acid monomers, and unsaturated tricarboxylic acid monomers. Unsaturated carboxylic acid ester monomers or unsaturated dicarboxylic acid anhydride monomers are preferable from the perspective of impact resistance and the like. One type of vinyl monomer may be used alone, or two or more types may be used in combination.

A particularly preferable vinyl monomer is an unsaturated carboxylic acid ester monomer, and an alkyl (meth)acrylate ester or a glycidyl (meth)acrylate ester is preferably used as this unsaturated carboxylic acid ester monomer ("(meth) acrylic acid" or "(meth)acrylate" is a general term known to persons skilled in the art for an "acrylic acid" or a "methacrylic acid", or an "acrylate" or a "methacrylate"). More preferable examples include methyl (meth)acrylate, ethyl (meth)acrylate, n-butyl (meth)acrylate, and glycidyl (meth) acrylate. When the acrylic rubber core-shell polymer contains an unsaturated carboxylic acid ester monomer such as methyl methacrylate as a vinyl monomer forming the vinyl (co)polymer contained in the shell layer, the content ratio of the unsaturated carboxylic acid ester monomer is ordinarily from 80 to 100 mass % and preferably from 90 to 100 mass % with respect to the total amount of the vinyl monomer. Therefore, a particularly preferable vinyl (co)polymer forming the shell layer of an acrylic rubber core-shell polymer is a (meth)acrylate (co)polymer, and a particularly preferable acrylic rubber core-shell polymer is an acrylic rubber-containing core-shell (meth)acrylate (co)polymer. When the acrylic rubber core-shell polymer contains an unsaturated carboxylic acid ester monomer having an epoxy group such as glycidyl methacrylate as the vinyl monomer component forming the vinyl (co)polymer contained in the shell layer, the adhesion between the acrylic rubber core-shell polymer and the aliphatic polyester resin is enhanced, which may further enhance the mechanical properties of the molded product having an effective thickness of 1 mm or more.

The acrylic rubber core-shell polymer is preferably contained in an amount of 1 to 50 parts by mass, more preferably from 1.5 to 30 parts by mass, and even more preferably from 2 to 20 parts by mass per 100 parts by mass of the aliphatic polyester resin. When the content of the acrylic rubber core-shell polymer is less than 1 part by mass, it may not be possible to maintain a good balance of the mechanical properties of the molded product having an effective thickness of 1 mm or more, whereas when the content exceeds 50 parts by mass, it may be difficult to uniformly disperse the acrylic rubber core-shell polymer in the aliphatic polyester resin by melt-kneading at the time of molding, and as a result, the mechanical properties of the molded product having an effective thickness of 1 mm or more may be diminished. An acrylic rubber core-shell polymer can be obtained as a commercially available product such as "Paraloid (registered trademark)" manufactured by Rohm and Haas Co., Ltd.

4. Other Compounding Agents

The aliphatic polyester resin composition forming the molded product having an effective thickness of 1 mm or more according to the present invention contains from 1 to 30 parts by mass of a carboxylic acid anhydride and, if desired, from 1 to 50 parts by mass of at least one type selected from the group consisting of a short fiber reinforcing material, a thermoplastic elastomer, and an acrylic rubber core-shell polymer per 100 parts by mass of the aliphatic polyester resin. The composition may also contain various other types of compounding agents as necessary within a scope that does not conflict with the object of the present invention, such as a thermal stabilizer, a photostabilizer, a UV absorber, a flame retardant, a plasticizer, a desiccant, a waterproofing agent, a water repellent preparation, a lubricant, a degradation accelerator, a degradation retardant, an end-capping agent, a dye, or a pigment. In addition, the composition may contain other resins other than the aliphatic polyester resin and the thermoplastic elastomer or acrylic rubber core-shell polymer, or other fillers other than a short fiber reinforcing material contained as desired.

For example, a degradable resin other than an aliphatic polyester may be contained as another resin, examples of which include polyether esters such as polydioxanone; aliphatic polycarbonates such as polytrimethylene carbonate; polyamino acids such as poly-a-pyrrolidone, polyaspartic acid, and polylysine; and copolymers or mixtures thereof. Furthermore, the composition may contain aromatic polyesters such as polyethylene terephthalate copolymers within a scope that does not diminish the object of the present invention. In addition, the composition may also contain polyolefin resins such as polyethylene and polypropylene; polyamide resins such as nylon; acrylic resins; polyethers such as polyethylene glycol and polypropylene glycol; denatured polyvinyl alcohol; soft polyolefin resins such as ethylene/glycidyl methacrylate copolymers, ethylene/propylene terpolymers, and ethylene/butylene homopolymers;

styrene copolymer resins; polyphenylene sulfide resins; polyether ether ketone resins; polyester resins such as polyethylene terephthalate and polybutylene terephthalate; polycarbonate resins; polyacetal resins; polysulfone resins; polyphenylene ether resins; polyimide resins; polyether imide resins; cellulose esters; polyurethane resins; phenol resins; melamine resins; unsaturated polyester resins; silicone resins; epoxy resins; and the like. When the aliphatic polyester resin composition forming the molded product having an effective thickness of 1 mm or more according to the present invention further contains other resins, the properties thereof such as the molding processability or the mechanical strength may be adjusted.

One type of these other compounding agents (including other resins) may be contained alone, or two more types may be contained in combination. The content of the other compounding agents is ordinarily not greater than 30 parts by mass, in many cases not greater than 10 parts by mass, and preferably not greater than 5 parts by mass per 100 parts by mass of the aliphatic polyester resin. The content may also be not greater than 1 part by mass, and the content may also be not greater than 0.5 parts by mass depending on the types of the other compounding agents.

II. Molded Product Having Effective Thickness of 1 mm or More

The molded product having an effective thickness of 1 mm or more according to the present invention is formed from an aliphatic polyester resin composition containing from 1 to 30 parts by mass of a carboxylic acid anhydride per 100 parts by mass of the aliphatic polyester resin described above.

1. Molded Product

The molded product having an effective thickness of 1 mm or more according to the present invention is not particularly limited with regard to the type, shape, and size of the molded product, applications, and the like as long as the effective thickness is 1 mm or more. For example, the shape of the molded product having an effective thickness of 1 mm or more may be a rod shape (including a square rod shape and a round rod shape), a sheet shape (including a sheet shape, a thin sheet shape, and a thick sheet shape; however, films having a thickness of 200 µm or less are not ordinarily included in the molded product of the present invention), a sphere shape (including an elliptical sphere shape), or the shapes described above having convexities or concavities, or a specific product shape (for example, a shape determined by the cavity shape of an injection molding die). The molded product having an effective thickness of 1 mm or more according to the present invention can be used as various mechanical parts or the like. Powders, pellets, and fibers are not ordinarily included in the molded product of the present invention.

2. Effective Thickness

The effective thickness of the molded product having an effective thickness of 1 mm or more according to the present invention refers to the dimensions required to fulfill the function required of the molded product and ordinarily corresponds to the maximum thickness or the maximum diameter. For example, when the molded product having an effective thickness of 1 mm or more according to the present invention forms a downhole tool member for hydrocarbon resource recovery described below, the flow of a well treatment fluid at the time of well drilling or the flow of hydrocarbon resources at the time of hydrocarbon resource recovery (production) is inhibited depending on the maximum thickness or the maximum diameter determined from the shape and size of the molded product having an effective thickness of 1 mm or more according to the present invention. On the other hand, since the molded product having an effective thickness of 1 mm or more according to the present invention disappears due to degradation or the like, the flow of a well treatment fluid or the flow of hydrocarbon resources corresponding to the maximum thickness or the maximum diameter determined from the shape and size of the molded product having an effective thickness of 1 mm or more is permitted. Therefore, the thickness of the space that is blocked or opened by the molded product having an effective thickness of 1 mm or more according to the present invention can be used as the effective thickness of the molded product, which ordinarily corresponds to the maximum thickness or the maximum diameter of the molded product. For example, in a molded product with a shape having thickness and vertical/horizontal dimensions, such as a sheet-shaped molded product, the vertical/horizontal dimensions are much greater than the thickness, but as described above, the space blocked or opened by the sheet is ordinarily a space corresponding to the thickness of the sheet, so the effective thickness of the molded product in the form of a thin sheet corresponds to the maximum thickness of the sheet, and the vertical/horizontal dimensions do not correspond to the effective thickness. However, in a mode of use in which a space corresponding to the length of the width (horizontal) dimension of a sheet is blocked and opened, for example, the width (horizontal) dimension may correspond to the effective thickness. When the molded product having an effective thickness of 1 mm or more according to the present invention is incorporated into another member such as a metal member, for example, fitted into a hollow hole part in another pipe-shaped member or fitted into a through-hole part in another member and used, the molded product having an effective thickness of 1 mm or more comes into contact with the well treatment fluid at both end faces of the hollow hole part or the through-hole part, so the distance between both end faces may correspond to the effective thickness.

The molded product having an effective thickness of 1 mm or more according to the present invention has an effective thickness of 1 or more, which ordinarily corresponds to the maximum thickness or the maximum diameter. Therefore, examples of the molded product having an effective thickness of 1 mm or more according to the present invention include sheet-shaped articles or square rod-shaped articles having a maximum thickness of 1 mm or more (in the cross section, the distance between parallel edges or the length of a perpendicular line from the apex to the opposing end corresponds to the maximum thickness), and examples thereof include rod-shaped articles or spherical articles having a maximum diameter of 1 mm or more. In the molded product having an effective thickness of 1 mm or more according to the present invention, the ratio of the magnitude of other dimensions (for example, the length of an edge of a sheet-shaped article, the diameter of a molded product fitted into a hollow hole part, or the like) with respect to the magnitude of the effective thickness is not particularly limited but is ordinarily from 1:0.01 to 1:10,000, in many cases from 1:0.05 to 1:1,000, and may be from approximately 1:0.1 to approximately 1:100.

Although the molded product having an effective thickness of 1 mm or more according to the present invention is a thick molded article having an effective thickness of 1 mm or more, which ordinarily corresponds to the maximum thickness or the maximum diameter, the molded product can degrade in a desired short amount of time even in low-temperature downhole environments such as a temperature of lower than 66° C., for example. The molded product having an effective thickness of 1 mm or more according to the present invention can also be applied to a molded product having an effective thickness of 5 mm or more and can also be applied to a molded product having an effective thickness of 10 mm or more, an effective thickness of 20 mm or more or 30 mm or more as desired, or, depending on the conditions and the like, an effective thickness of 50 mm or more. There is no particular upper limit of the effective thickness of the molded product having an effective thickness of 1 mm or more according to the present invention, but the effective thickness is ordinarily in a range of not more than 1,000 mm and in many cases not more than 500 mm from the perspective that degradation becomes very difficult in a desired short amount of time.

3. Production Method for Molded Product Having Effective Thickness of 1 mm or More The production method of the molded product having an effective thickness of 1 mm or more according to the present invention is not particularly limited, and a molded product having an effective thickness of 1 mm or more can be formed by performing a well-known heat molding method such as injection molding, extrusion molding (including solidification- and extrusion-molding), compression molding, or centrifugal molding on an aliphatic polyester resin composition containing from 1 to 30 parts by mass of a carboxylic acid anhydride and, as necessary, from 1 to 50 parts by mass of at least one type selected from the group consisting of a short fiber reinforcing material, a thermoplastic elastomer, and an acrylic rubber core-shell polymer per 100 parts by mass of an aliphatic polyester resin containing not less than 50 mass % of a PGA. In addition, a molded product having an effective thickness of 1 mm or more can be formed by performing machining such as cutting as necessary on the primary molded product formed by the heat molding method described above so as to produce a secondary molded product. For example, a spherical molded product having an effective thickness of 1 mm or more can be produced by injection molding, and a spherical molded product having an effective thickness of 1 mm or more can also be produced by performing machining such as cutting on a round rod-shaped primary molded product produced by solidification- and extrusion-molding.

4. Properties of Molded Product Having Effective Thickness of 1 mm or More

Since the molded product having an effective thickness of 1 mm or more according to the present invention is a molded product having an effective thickness of 1 mm or more formed by an aliphatic polyester resin composition containing from 1 to 30 parts by mass of a carboxylic acid anhydride and, as necessary, containing from 1 to 50 parts by mass of at least one type selected from the group consisting of a short fiber reinforcing material, a thermoplastic elastomer, and an acrylic rubber core-shell polymer per 100 parts by mass of an aliphatic polyester resin containing not less than 50 mass % of a PGA, the molded product has excellent degradability even in relatively low-temperature downhole environments such as a temperature of lower than 66° C. so as to be degradable in a desired short amount of time, and also has sufficient mechanical strength. Since the molded product having an effective thickness of 1 mm or more according to the present invention is formed from an aliphatic polyester resin composition containing a prescribed amount of a carboxylic acid anhydride, there is the effect that the mechanical strength is enhanced or that the rate of reduction in mechanical strength is small (for example, 30% or less, 20% or less, or, depending on the type of the mechanical property, 10% or less). The fact that the molded product having an effective thickness of 1 mm or more according to the present invention is a molded product having sufficient mechanical strength can be confirmed by measuring the izod impact strength (notched), the tensile strength, and the bending modulus of elasticity described below.

Izod Impact Strength (Notched)

The molded product having an effective thickness of 1 mm or more according to the present invention can be said to have sufficient impact resistance for practical purposes as long as the izod impact strength (notched) measured with a test piece as described below is not less than 25 J/m. The izod impact strength (notched) is measured as follows for a notched test piece in accordance with ASTM D256 (corresponding to ISO180). A flat sheet-shaped test piece (notched) having a vertical dimension of 63 mm, a horizontal dimension of 13 mm, and a thickness of 3 mm is prepared, as a test piece for confirming the impact resistance of the molded product having an effective thickness of 1 mm or more according to the present invention, by performing molding using an injection molding machine having a single-axis full-flight screw and then performing notch processing. The impact energy absorbed when the notched test piece is broken at normal temperature (temperature of 23° C.±1° C.) is measured for the prepared test piece using a pendulum impact test machine, and the izod impact strength (average value for n=5; unit: J/m) is calculated.

When the izod impact strength (notched) of the test piece is too small, there is a risk that the toughness of the molded product having an effective thickness of 1 mm or more may be insufficient and that fracturing, breaking, or fragmentation may occur when a downhole tool member for hydrocarbon resource recovery formed from the molded product having an effective thickness of 1 mm or more, for example, makes contact or collides with the member used for well drilling. It can be said that the impact resistance of the molded product having an effective thickness of 1 mm or more is superior when the izod impact strength (notched) of the test piece is preferably not less than 28 J/m and more preferably not less than 30 J/m. There is no particular upper limit to the izod impact strength (notched), but the value is generally 200 J/m or less.

Tensile Strength

The molded product having an effective thickness of 1 mm or more according to the present invention can be said to have sufficient tensile strength for practical purposes as long as the tensile strength measured with a prescribed test piece is not less than 80 MPa. The tensile strength of the test piece can be measured in accordance with JIS K7113. That is, for a test piece of a shape prescribed by JIS K7113 prepared by performing injection molding under the same conditions as in the preparation of the test piece used for the measurement of impact strength (test piece No. 1), a tensile test is performed at room temperature (temperature of 23° C.±1° C.) at a rate of 50 mm/min, and the tensile stress when the test piece breaks is measured to calculate the strength, which is used as the tensile strength of the test piece (average value for n=5; unit: MPa).

When the tensile strength of the test piece is too small, there is a risk that the tensile strength of the molded product having an effective thickness of 1 mm or more may be insufficient and that when a downhole tool member for hydrocarbon resource recovery formed from the molded product having an effective thickness of 1 mm or more is disposed inside a downhole in a deep subterranean high-temperature environment, or when boring or fracturing is performed, the downhole tool member may fracture, or breaking or fragmentation may occur. It can be said that the tensile strength of the molded product having an effective thickness of 1 mm or more is superior when the tensile strength of the test piece is preferably not less than 85 MPa and more preferably not less than 90 MPa. There is no particular upper limit to the tensile strength, but the value is generally approximately 300 MPa or less.

Bending Modulus of Elasticity

The molded product having an effective thickness of 1 mm or more according to the present invention can be said to have sufficient bending properties for practical purposes as long as the bending modulus of elasticity measured with a prescribed test piece is not less than 4,000 MPa. The bending modulus of elasticity of the test piece can be measured in accordance with JIS K7111 (corresponding to ISO178). That is, for a flat sheet-shaped test piece having a vertical dimension of 128 mm, a horizontal dimension of 13 mm, and a thickness of 3 mm prepared by performing injection molding under the same conditions as in the preparation of the test piece used in the measurement of impact strength, a bending test is performed at room temperature (temperature of 23° C.±1° C.), a span of 48 mm, and a test rate of 1 mm/min, and the bending modulus of elasticity is calculated from the initial gradient of the of bending load/bending curve (average value for n=5; unit: MPa).

When the bending modulus of elasticity of the test piece is too small, there is a risk that the bending properties of the molded product having an effective thickness of 1 mm or more may be insufficient and that when a downhole tool member for hydrocarbon resource recovery formed from the molded product having an effective thickness of 1 mm or more is disposed inside a downhole in a deep subterranean high-temperature environment, or when boring or fracturing is performed, the downhole tool member may be deformed and become unable to exhibit the function required of the member. It can be said that the bending modulus of elasticity of the molded product having an effective thickness of 1 mm or more is superior when the bending modulus of elasticity of the test piece is preferably not less than 4,200 MPa and more preferably not less than 4,500 MPa. There is no particular upper limit to the bending modulus of elasticity, but the value is generally 15,000 MPa or less.

Degradability-Rate of Decrease in Thickness

The molded product having an effective thickness of 1 mm or more according to the present invention has excellent degradability. It can be confirmed that the molded product having an effective thickness of 1 mm or more has excellent degradability even in relatively low-temperature downhole environments such as a temperature of lower than 66° C., for example, so as to be degradable in a desired short amount of time from the fact that the rate of decrease in thickness when a test piece having a thickness of 10 mm is immersed in water at a temperature of 60° C. (also called the "rate of decrease in thickness of the molded product" hereafter) is not less than 0.02 mm/hr. The rate of decrease in thickness of the test piece having a thickness of 10 mm is measured with the following method. Specifically, a required number of sheet-shaped test pieces having a thickness of 10 mm are prepared by press molding. The pressing conditions entail a temperature of 260° C., preheating for 7 minutes, and 3 minutes under a pressure of 5 MPa, and the test piece is rapidly cooled with a water cooling plate after pressing. Next, the prepared test piece is placed in a 1 L autoclave at a temperature of 60° C., and an immersion test is performed by filling the autoclave with water (deionized water). The test piece is retrieved after immersion at predetermined prescribed time intervals, and the cross-sectional surface is cut out. After the test piece is left to stand overnight in a dry room and dried, the thickness of the core part (hard portion) of the test piece is measured, and the decrease in thickness of the test piece is measured from the difference relative to the thickness prior to immersion (initial thickness; specifically, 10 mm). The time variation in the decrease in thickness of the test piece is determined based on the measurements of the decrease in thickness of the test piece taken at different immersion times, and the rate of decrease in thickness in the test piece having a thickness of 10 mm is calculated from the time variation in the decrease in thickness of the test piece in a range over which linearity is observed in the time variation of the decrease in thickness of the test piece (unit: mm/hr).

When the rate of decrease in thickness of the test piece having a thickness of 10 mm is too small, the degradability of the molded product having an effective thickness of 1 mm or more is insufficient, and the degradability in relatively low-temperature downhole environments such as a temperature of lower than 66° C., for example, is insufficient, so the molded product cannot be degraded in a desired short amount of time. It can be said that the degradability of the molded product having an effective thickness of 1 mm or more is superior when the rate of decrease in thickness of a test piece having a thickness of 10 mm is preferably not less than 0.022 mm/hr and more preferably not less than 0.025 mm/hr. There is no particular upper limit to the rate of decrease in thickness of the test piece having a thickness of 10 mm, but the value is approximately not more than 0.1 mm/hr due to the risk that the seal function for a prescribed amount of time required for the downhole tool member may not be expressed due to unforeseen early degradation, for example.

Degradability-Degradation Lead Time

The molded product having an effective thickness of 1 mm or more according to the present invention can be formed as a molded product having excellent initial degradability with a lead time (also called the "degradation lead time" hereafter) of preferably not more than 40 hours until degradation begins when the molded product is immersed in water at a temperature of 60° C. The degradation lead time can be confirmed by measuring the time until the thickness begins to decrease based on surface degradation when a test piece having a thickness of 10 mm is immersed in water at a temperature of 60° C. That is, in the measurement of the rate of decrease in thickness of the molded product described above, the time until a decrease in thickness of the test piece having a thickness of 10 mm is first observed is defined as the degradation lead time of the molded product (unit: hour). As long as the degradation lead time of the molded product is not more than 40 hours, it can be said that the molded product having an effective thickness of 1 mm or more has excellent initial degradability even in relatively low-temperature downhole environments such as a temperature of lower than 66° C., for example, so as to be degradable in a desired short amount of time.

For example, when the molded product having an effective thickness of 1 mm or more according to the present invention is used as a ball and/or a ball seat, which is a downhole tool member for hydrocarbon resource recovery, the ball is released from contact with the seat or restraint by the ball seat at the point when the degradation of the ball and/or the ball seat begins, so the ball withdraws from the ball seat, and the fluid seal (isolation) due to the ball and the ball seat rapidly disappears. As a result, there is the effect of eliminating the risk that the flow path of hydrocarbon resources such as petroleum or gas will be obstructed. That is, the degradation lead time, which expresses the time until the surface begins to degrade, has a very large significance for a downhole tool member for hydrocarbon resource recovery such as a ball sealer.

When the degradation lead time of the molded product measured with the test piece having a thickness of 10 mm is too long, the degradability of the molded product having an effective thickness of 1 mm or more is insufficient, and a long time is required until degradation begins in relatively low-temperature downhole environments such as a temperature of lower than 66° C., for example. As a result, the molded product cannot degrade in a desired short amount of time. The degradation lead time of the molded product is more preferably not more than 36 hours and even more preferably not more than 32 hours, and the degradation lead time can be adjusted by the content or the like of the short fiber reinforcing material or the like. It can be said that the initial degradability of the molded product having an effective thickness of 1 mm or more is superior when the degradation lead time not more than 25 hours, more preferably not more than 20 hours, and particularly preferably not more than 15 hours as desired (ordinarily when a short fiber reinforcing material is not contained). There is no particular lower limit to the degradation lead time of the molded product, but the value is generally not less than 1 hour due to the risk that the seal function or the like for a prescribed amount of time required for the downhole tool member may not be expressed due to unforeseen early degradation, for example. By irradiating the molded product having an effective thickness of 1 mm or more according to the present invention with ionizing radiation such as an electron beam, it is possible to further accelerate degradation and, in particular, to reduce the degradation lead time.

III. Downhole Tool Member for Hydrocarbon Resource Recovery

The present invention provides a downhole tool member for hydrocarbon resource recovery formed from the molded product having an effective thickness of 1 mm or more described above—that is, a downhole tool member used in hydrocarbon resource recovery. The downhole tool member for hydrocarbon resource recovery formed from the molded product having an effective thickness of 1 mm or more is not particularly limited as long as the member forms a part of a downhole tool member for hydrocarbon resource recovery such as a frac plug, a bridge plug, a cement retainer, a perforation gun, a ball sealer, an isolation plug, or a packer, and examples of a member forming a part of a plug include a mandrel or annular members such as a slip, a wedge, and a ring. A ball and a ball seat constituting a member or ball sealer forming a part of a plug may also be used. Furthermore, when performing cementing, a screw used as a temporary sealing material also falls under the category of a downhole tool member for hydrocarbon resource recovery. Therefore, the downhole tool member for hydrocarbon resource recovery formed from the molded product having an effective thickness of 1 mm or more according to the present invention is preferably at least one type of a downhole tool member selected from the group consisting of an annular member, a ball, a ball seat, and a screw. The size and shape of the downhole tool member for hydrocarbon resource recovery may be set appropriately in accordance with the type of the downhole tool member for hydrocarbon resource recovery. The downhole tool member for hydrocarbon resource recovery of the present invention is formed as the molded product having an effective thickness of 1 mm or more according to the present invention or may be produced by using the molded product having an effective thickness of 1 mm or more according to the present invention as a primary molded product and performing machining such as cutting so as to obtain a secondary molded product.

IV. Aliphatic Polyester Resin Composition for Downhole Tool Member for Hydrocarbon Resource Recovery The present invention provides an aliphatic polyester resin composition for a downhole tool member for hydrocarbon resource recovery for forming the downhole tool member for hydrocarbon resource recovery described above (also called an "aliphatic polyester resin composition for a downhole member" hereafter). The aliphatic polyester resin composition for a downhole tool of the present invention is an aliphatic polyester resin composition for a downhole tool containing from 1 to 30 parts by mass of a carboxylic acid anhydride per 100 parts by mass of an aliphatic polyester resin containing not less than 50 mass % of a PGA, and is an aliphatic polyester resin composition for a downhole tool further containing from 1 to 50 parts by mass of at least one type selected from the group consisting of a short fiber reinforcing material, a thermoplastic elastomer, and an acrylic rubber core-shell polymer per 100 parts by mass of the aliphatic polyester resin containing at not less than 50 mass % of a PGA. In the aliphatic polyester resin composition for a downhole tool of the present invention, the components described above can be used as the aliphatic polyester resin, the carboxylic acid anhydride, the at least one type selected from the group consisting of a short fiber reinforcing material, a thermoplastic elastomer, and an acrylic rubber core-shell polymer and other compounding agents that may be contained as necessary, and the contents thereof are as described above.

V. Well Drilling Method

The present invention provides a well drilling method using the aforementioned downhole tool member for hydrocarbon resource recovery, wherein the downhole tool member for hydrocarbon resource recovery is degraded after well treatment (also called the "well drilling method of the present invention" hereafter). That is, the well drilling method of the present invention is a well drilling method comprising performing well treatment using the various well treatment fluids described above, with a downhole tool member for hydrocarbon resource recovery formed from the molded product having an effective thickness of 1 mm or more, which is formed from an aliphatic polyester resin composition containing from 1 to 30 parts by mass of a carboxylic acid anhydride per 100 parts by mass of an aliphatic polyester resin containing not less than 50 parts by mass of a PGA, and then degrading the downhole tool member. With the well drilling method of the present invention, the downhole tool member is formed from a molded product having sufficient mechanical strength, so well treatment such as fracturing can be performed reliably, and the molded product has excellent degradability even in relatively low-temperature downhole environments such as a temperature of lower than 66° C. and can be degraded in a desired short amount of time, which provides an efficient and economical well drilling method.

EXAMPLES

The molded product having an effective thickness of 1 mm or more according to the present invention, the molded product comprising an aliphatic polyester resin composition containing from 1 to 30 parts by mass of a carboxylic acid anhydride per 100 parts by mass of an aliphatic polyester resin containing not less than 50 mass % of a PGA, and the effective thickness being 1 mm or more, will be described in detail hereinafter using working examples and comparative examples. The present invention is not limited to these working examples. The physical properties and characteristics of the molded product having an effective thickness of 1 mm or more were measured with the following methods.

Weight Average Molecular Weight

The weight average molecular weight (Mw) of the aliphatic polyester resin was determined using a gel permeation chromatography (GPC) apparatus. The measurement conditions were as follows.

Device: Shodex-104, manufactured by Showa Denko K.K.
Columns: two HFIP-606M and, as a precolumn, one HFIP-G were connected in series
Column Temperature: 40° C.
Eluant: hexafluoroisopropanol (HFIP) solution in which 5 mM of sodium trifluoroacetate was dissolved
Flow rate: 0.6 mL/min
Detector: RI (differential refractive index) detector
Molecular weight calibration: five types of standard polymethylmethacrylates having different molecular weights were used Melting Point The melting point (Tm) of the aliphatic polyester resin was determined in a nitrogen atmosphere using a differential scanning calorimeter (DSC-822e manufactured by Mettler-Toledo International Inc.).

Izod Impact Strength (Notched)

The izod impact strength (notched) was measured as follows for a notched test piece in accordance with ASTM D256 (corresponding to IS0180). That is, a flat sheet-shaped test piece (notched) having a vertical dimension of 63 mm, a horizontal dimension of 13 mm, and a thickness of 3 mm was prepared by molding the aliphatic polyester resin composition using an injection molding machine having a single-axis full-flight screw and then performing notch processing. The impact energy absorbed when the notched test piece is broken at room temperature (temperature of 23° C.±1° C.) is measured for the prepared test piece using a pendulum impact test machine (manufactured by Shimadzu, Co., Ltd.; load: 40 kg), and the izod impact strength (average value for n=5; unit: J/m) was calculated.

Tensile Strength

The tensile strength was measured in accordance with JIS K7113. That is, for a test piece of a shape prescribed by JIS K7113 prepared by performing injection molding under the same conditions as in the preparation of the test piece used for the measurement of impact strength (test piece No. 1), a tensile test was performed at room temperature (temperature of 23° C.±1° C.) at a rate of 50 mm/min using a material tester (2t Autograph AG-2000E manufactured by Shimadzu Co., Ltd.), and the tensile stress when the test piece breaks was measured to calculate the strength, which was used as the tensile strength of the test piece (average value for n=5; unit: MPa).

Bending Modulus of Elasticity

The bending modulus of elasticity of was measured in accordance with JIS K7111 (corresponding to IS0178). That is, for a flat sheet-shaped test piece having a vertical dimension of 128 mm, a horizontal dimension of 13 mm, and a thickness of 3 mm prepared by performing injection molding under the same conditions as in the preparation of the test piece used in the measurement of impact strength, a bending test was performed at room temperature (temperature of 23° C.±1° C.), a span of 48 mm, and a test rate of 1 mm/min using a material tester (2t Autograph AG-2000E manufactured by Shimadzu Co., Ltd.), and the bending modulus of elasticity was calculated from the initial gradient of the of bending load/bending curve (average value for n=5; unit: MPa).

Rate of decrease in thickness

The rate of decrease in thickness was measured with the following method using a test piece having a thickness of 10 mm. Specifically, a required number of sheet-shaped test pieces having a thickness of 10 mm were prepared by press molding. The pressing conditions entailed a temperature of 260° C., preheating for 7 minutes, and 3 minutes under a pressure of 5 MPa, and the test piece was rapidly cooled with a water cooling plate after pressing. Next, the prepared test piece with a thickness of 10 mm was placed in a 1 L autoclave at a temperature of 60° C., and an immersion test was performed by filling the autoclave with water (deionized water). The test piece was retrieved after immersion at predetermined prescribed time intervals, and the cross-sectional surface was cut out. After the test piece was left to stand overnight in a dry room and dried, the thickness of the core part (hard portion) of the test piece was measured, and the decrease in thickness of the test piece was measured from the difference relative to the thickness prior to immersion (initial thickness; specifically, 10 mm). The time variation in the decrease in thickness of the test piece was determined based on the measurements of the decrease in thickness of the test piece taken at different immersion times, and the rate of decrease in thickness in the molded product was calculated from the time variation in the decrease in thickness of the test piece in a range over which linearity was observed in the time variation of the decrease in thickness of the test piece (unit: mm/hr).

Degradation Lead Time

That is, in the measurement of the rate of decrease in thickness of the test piece having a thickness of 10 mm described above, the time until a decrease in thickness of the test piece was first observed was defined as the degradation lead time of the molded product (unit: hour).

Working Example 1

A test sample for measuring the izod impact strength (notched), a test sample for measuring the tensile strength, and a test sample for measuring the bending modulus of elasticity were prepared using an injection molding machine (IS75E manufactured by Toshiba Machine Co., Ltd.) from an aliphatic polyester resin composition obtained by blending 3 parts by mass of 3,3',4,4'-benzophenone-tetracarboxylic dianhydride (BTDA) as a carboxylic acid anhydride into 100 parts by mass of a polyglycolic acid homopolymer (manufactured by the Kureha Corporation; Mw: 220,000; Tm: 225° C.; also called "PGA1" hereafter) as an aliphatic polyester resin. In addition, a test piece for measuring the rate of decrease in thickness and the degradation lead time for testing the degradability in water at a temperature of 60° C. (also notated as "degradability (in 60° C. water)" hereafter) was prepared using a press molding machine from the aliphatic polyester resin composition described above. For the prepared test pieces, the izod impact strength (notched) (also notated as "impact strength (notched)" hereafter), the tensile strength, and the bending modulus of elasticity were measured, and the rate of decrease in thickness and the degradation lead time were measured as indices of degradability (in 60° C. water). The measurement results are shown in Table 1 together with the content of the carboxylic acid anhydride (parts by mass and parts by mass per 100 parts by mass of the polyglycolic acid (PGA1) (also notated as " per PGA100" hereafter)).

Working Example 2

Test pieces were prepared in the same manner as in Working Example 1 with the exception that 5 parts by mass of BTDA was blended as a carboxylic acid anhydride, and the impact strength (notched), the tensile strength, the bending modulus of elasticity, and the degradability (in 60° C. water) were measured. The measurement results are shown in Table 1 together with the content of the carboxylic acid anhydride.

Comparative Example 1

Test pieces were prepared in the same manner as in Working Example 1 with the exception that a carboxylic acid anhydride was not blended, and the impact strength (notched), the tensile strength, the bending modulus of elasticity, and the degradability (in 60° C. water) were measured. The measurement results are shown in Table 1.

Working Example 3

Test samples were prepared in the same manner as in Working Example 1 with the exception that 3 parts by mass of BTDA (equivalent to 3.8 parts by mass of BTDA per 100 parts by mass of PGA2) was blended as a carboxylic acid anhydride and 20 parts by mass of glass fibers (03JAFT592S manufactured by Owens Corning Japan LLC; diameter (D): 10 μm; aspect ratio (L/D) after melt-kneading: 30) (equivalent to 25 parts by mass of glass fibers per 100 parts by mass Working Example 4

Test pieces were prepared in the same manner as in Working Example 3 with the exception that 5 parts by mass of BTDA (equivalent to 6.3 parts by mass per 100 parts by mass of PGA 2) was blended as a carboxylic acid anhydride, and the impact strength (notched), the tensile strength, the bending modulus of elasticity, and the degradability (in 60° C. water) were measured. The measurement results are shown in Table 1 together with the content of the carboxylic acid anhydride and the short fiber reinforcing material.

Comparative Example 2

Test pieces were prepared in the same manner as in Working Example 3 with the exception that a carboxylic acid anhydride and a short fiber reinforcing material were not blended, and the impact strength (notched), the tensile strength, the bending modulus of elasticity, and the degradability (in 60° C. water) were measured. The measurement results are shown in Table 1.

Comparative Example 3

Test pieces were prepared in the same manner as in Working Example 3 with the exception that a carboxylic acid anhydride was not blended, and the impact strength (notched), the tensile strength, the bending modulus of elasticity, and the degradability (in 60° C. water) were measured. The measurement results are shown in Table 1 together with the content of the short fiber reinforcing material.

TABLE 1

| | | Aliphatic polyester resin | | Carboxylic acid anhydride | | Short fiber reinforcing material | | Impact strength (notched) J/m | Tensile strength MPa | Bending modulus of elasticity MPa | Degradability (in 60° C. water) | |
|---|---|---|---|---|---|---|---|---|---|---|---|---|
| | | | (part by mass) | (part by mass) | Per PGA 100 | (part by mass) | Per PGA100 | | | | Rate of decrease in thickness mm/hr | Degradation lead time Hour |
| Working Example 1 | PGA1 | 100 | | 3 | 3 | 0 | 0 | 32 | 92 | 5016 | 0.0253 | 12.2 |
| Working Example 2 | PGA1 | 100 | | 5 | 5 | 0 | 0 | 32 | 99 | 4994 | 0.0326 | 4.9 |
| Comparative Example 1 | PGA1 | 100 | | 0 | 0 | 0 | 0 | 43 | 91 | 5756 | 0.0150 | 62.1 |
| Working Example 3 | PGA2 | 80 | | 3 | 3.8 | 20 | 25 | 94 | 208 | 10132 | 0.0303 | 30.3 |
| Working Example 4 | PGA2 | 80 | | 5 | 6.3 | 20 | 25 | 92 | 206 | 10039 | 0.0400 | 23.5 |
| Comparative Example 2 | PGA2 | 100 | | 0 | 0 | 0 | 0 | 35 | 103 | 6247 | 0.0123 | 65.0 |
| Comparative Example 3 | PGA2 | 80 | | 0 | 0 | 20 | 25 | 89 | 225 | 10331 | 0.0121 | 65.0 | of PGA 2) were blended as a short fiber reinforcing material into 80 parts by mass of a polyglycolic acid homopolymer (manufactured by the Kureha Corporation; Mw: 200,000; Tm: 225° C.; also called "PGA2" hereafter) as an aliphatic polyester resin, and the impact strength (notched), the tensile strength, the bending modulus of elasticity, and the degradability (in 60° C. water) were measured. The measurement results are shown in Table 1 together with the content of the carboxylic acid anhydride and the short fiber reinforcing material.

It was found from Table 1 that the molded products having an effective thickness of 1 mm or more in Working Examples 1 and 2, which were molded products having an effective thickness of 1 mm or more and were formed from an aliphatic polyester resin composition containing from 1 to 30 parts by mass of a carboxylic acid anhydride per 100 parts by mass of an aliphatic polyester resin containing not less than 50 mass % of a PGA, yielded the following results: 1) the lead time until degradation begins when the molded product was immersed in water at a temperature of 60° C.

(degradation lead time) was not more than 40 hours, and was specifically not more than 20 hours; 2) the rate of decrease in thickness when the molded product was immersed in water at a temperature of 60° C. was not less than 0.02 mm/hr, and it was confirmed that the degradability was dramatically improved in comparison to Comparative Example 1; 3) the izod impact strength (notched) was not less than 25 J/m, which was a decrease within a range that did not cause a problem from a practical standpoint in comparison to Comparative Example 1; 4) the tensile strength was not less than 80 MPa, and an improvement was observed in comparison to Comparative Example 1; and 5) the bending modulus of elasticity was not less than 4,000 MPa. Therefore, it was found that the molded products having an effective thickness of 1 mm or more in Working Examples 1 and 2, which were formed from an aliphatic polyester resin composition had sufficient mechanical strength for practical purposes, had excellent degradability and outstanding initial degradability, in particular, even in relatively low-temperature downhole environments such as a temperature of lower than 66° C., for example, so as to be degradable in a desired short amount of time.

In contrast, it was found that although the molded product having an effective thickness of 1 mm or more in Comparative Example 1, which was formed from an aliphatic polyester resin composition not containing a carboxylic acid anhydride, had sufficient mechanical strength for practical purposes, the rate of decrease in thickness when the molded product was immersed in water at a temperature of 60° C. was less than 0.02 mm/hr, and the degradation lead time also exceeded 40 hours. Therefore, it was found that the molded product having an effective thickness of 1 mm or more in Comparative Example 1, which was formed from an aliphatic polyester resin composition, did not have excellent degradability in relatively low-temperature downhole environments such as a temperature of lower than 66° C., for example, and cannot be degraded in a desired short amount of time.

In addition, it was found from Table 1 that the molded products having an effective thickness of 1 mm or more in Working Examples 3 and 4, which were molded products having an effective thickness of 1 mm or more formed from an aliphatic polyester resin composition containing from 1 to 30 parts by mass of a carboxylic acid anhydride and further containing from 1 to 50 parts by mass of a short fiber reinforcing material per 100 parts by mass of an aliphatic polyester resin containing not less than 50 mass % of a PGA, yielded the following results: the degradation lead time when immersed in water at a temperature of 60° C. was not more than 40 hours, and was specifically not more than 32 hours; the rate of decrease in thickness was also not less than 0.02 mm/hr, which was dramatically improved in comparison to Comparative Example 3, and it was thereby confirmed that the molded products had excellent degradability and outstanding initial degradability, in particular, even in relatively low-temperature downhole environments such as a temperature of lower than 66° C., for example, so as to be degradable in a desired short amount of time; the izod impact strength (notched) was 94 J/m or 92 J/m, and an improvement was observed in comparison to Comparative Example 3; the tensile strength was 208 MPa or 206 MPa, which was a decreases of less than 10% in a range that did not cause a problem from a practical standpoint in comparison to Comparative Example 3; and the bending modulus of elasticity was 10,132 MPa or 10,039 MPa, which indicated that the molded products had sufficient mechanical strength from a practical perspective.

In contrast, it was found that although the molded product having an effective thickness of 1 mm or more in Comparative Example 2, which was formed from an aliphatic polyester resin composition not containing a carboxylic acid anhydride and a short fiber reinforcing material, had sufficient mechanical strength for practical purposes, the rate of decrease in thickness when the molded product was immersed in water at a temperature of 60° C. was less than 0.02 mm/hr, and the degradation lead time also exceeded 40 hours. Therefore, it was found that the molded product having an effective thickness of 1 mm or more in Comparative Example 2, which was formed from an aliphatic polyester resin composition, did not have excellent degradability in relatively low-temperature downhole environments such as a temperature of lower than 66° C., for example, and could not be degraded in a desired short amount of time.

Furthermore, it was found that although the molded product having an effective thickness of 1 mm or more in Comparative Example 3, which was formed from an aliphatic polyester resin composition containing a short fiber reinforcing material but not containing a carboxylic acid anhydride, had excellent mechanical strength, the rate of decrease in thickness when the molded product was immersed in water at a temperature of 60° C. was less than 0.02 mm/hr, and the degradation lead time also exceeded 40 hours. Therefore, it was found that the molded product having an effective thickness of 1 mm or more in Comparative Example 3, which was formed from an aliphatic polyester resin composition, did not have excellent degradability in relatively low-temperature downhole environments such as a temperature of lower than 66° C., for example, and could not be degraded in a desired short amount of time.

Working Example 5

Test pieces were prepared in the same manner as in Working Example 1 with the exception that 3 parts by mass of BTDA (equivalent to 3.1 parts by mass of BTDA per 100 parts by mass of PGA1) as a carboxylic acid anhydride and 4 parts by mass of a thermoplastic polyester elastomer ("Hytrel (registered trademark) 3078FG" manufactured by Du Pont-Toray Co., Ltd.) (equivalent to 4.2 parts by mass per 100 parts by mass of PGA1) as a thermoplastic elastomer were blended into 96 parts by mass of a polyglycolic acid homopolymer (PGA1) as an aliphatic polyester resin, and the impact strength (notched), the tensile strength, the bending modulus of elasticity, and the degradability (in 60° C. water) were measured. The measurement results are shown in Table 2 together with the content of the carboxylic acid anhydride and the thermoplastic elastomer.

Working Example 6

Test pieces were prepared in the same manner as in Working Example 5 with the exception that 5 parts by mass of BTDA (equivalent to 5.2 parts by mass per 100 parts by mass of PGA1) was blended as a carboxylic acid anhydride, and the impact strength (notched), the tensile strength, the bending modulus of elasticity, and the degradability (in 60° C. water) were measured. The measurement results are shown in Table 2 together with the content of the carboxylic acid anhydride and the thermoplastic elastomer.

Working Example 7

Test pieces were prepared in the same manner as in Working Example 5 with the exception that 10 parts by mass of BTDA (equivalent to 10.4 parts by mass per 100 parts by mass of PGA1) was blended as a carboxylic acid anhydride, and the impact strength (notched), the tensile strength, the bending modulus of elasticity, and the degradability (in 60° C. water) were measured. The measurement results are shown in Table 2 together with the content of the carboxylic acid anhydride and the thermoplastic elastomer.

Comparative Example 4

Test pieces were prepared in the same manner as in Working Example 5 with the exception that a carboxylic acid anhydride was not blended, and the impact strength (notched), the tensile strength, the bending modulus of elasticity, and the degradability (in 60° C. water) were measured. The measurement results are shown in Table 2 together with the content of the thermoplastic elastomer.

Furthermore, it was found that although the molded product having an effective thickness of 1 mm or more in Comparative Example 4, which was formed from an aliphatic polyester resin composition containing a thermoplastic elastomer but not containing a carboxylic acid anhydride, had balanced mechanical properties, the rate of decrease in thickness when the molded product was immersed in water at a temperature of 60° C. was less than 0.02 mm/hr, and the degradation lead time also exceeded 40 hours. Therefore, it was found that the molded product having an effective thickness of 1 mm or more in Comparative Example 4, which was formed from an aliphatic polyester resin composition, did not have excellent degradability in relatively low-temperature downhole environments such as a temperature of lower than 66° C., for example, and cannot be degraded in a desired short amount of time.

TABLE 2

| | Aliphatic polyester resin | | Carboxylic acid anhydride | | Thermoplastic elastomer | | Impact strength (notched) J/m | Tensile strength MPa | Bending modulus of elasticity MPa | Degradability (in 60° C. water) | |
|---|---|---|---|---|---|---|---|---|---|---|---|
| | | (part by mass) | (part by mass) | per PGA100 | (part by mass) | Per PGA100 | | | | Rate of decrease in thickness mm/hr | Degradation lead time Hours |
| Working Example 5 | PGA1 | 96 | 3 | 3.1 | 4 | 4.2 | 50 | 113 | 5940 | 0.0228 | 19.9 |
| Working Example 6 | PGA1 | 96 | 5 | 5.2 | 4 | 4.2 | 48 | 114 | 5913 | 0.0283 | 15.9 |
| Working Example 7 | PGA1 | 96 | 10 | 10.4 | 4 | 4.2 | 39 | 116 | 5828 | 0.0546 | 9.3 |
| Comparative Example 4 | PGA1 | 96 | 0 | 0 | 4 | 4.2 | 50 | 117 | 6091 | 0.0172 | 55.6 |

It was found from Table 2 that the molded products having an effective thickness of 1 mm or more in Working Examples 5 to 7, which were molded products having an effective thickness of 1 mm or more and were formed from an aliphatic polyester resin composition containing from 1 to 30 parts by mass of a carboxylic acid anhydride and further containing from 1 to 50 parts by mass of a thermoplastic elastomer per 100 parts by mass of an aliphatic polyester resin containing not less than 50 mass % of a PGA, yielded the following results: the degradation lead time when the molded product was immersed in water at a temperature of 60° C. was not more than 40 hours, and was specifically not more than 20 hours; the rate of decrease in thickness was also not less than 0.02 mm/hr, which was dramatically improved in comparison to Comparative Example 4, which did not contain a carboxylic acid anhydride, and it was thereby confirmed that the molded products had excellent degradability and outstanding initial degradability, in particular, even in relatively low-temperature downhole environments such as a temperature of lower than 66° C., for example, so as to be degradable in a desired short amount of time; the izod impact strength (notched) was from 39 to 50 J/m, indicating that the molded products had an impact resistance that did not cause a problem from a practical standpoint in comparison to Comparative Example 4; the tensile strength was from 113 to 116 MPa, which did not differ from Comparative Example 4; and the bending modulus of elasticity was from 5,828 to 5,940 MPa, which indicated that sufficient mechanical properties from a practical standpoint were maintained with good balance.

Working Example 8

Test pieces were prepared in the same manner as in Working Example 5 with the exception that 4 parts by mass of an acrylic rubber-containing core-shell (meth)acrylate (co)polymer ("Paraloid (registered trademark) EXL2314" manufactured by Rohm and Haas Co., Ltd.) (equivalent to 4.2 parts by mass per 100 parts by mass of PGA1) was blended as an acrylic rubber core-shell polymer instead of a thermoplastic elastomer, and the impact strength (notched), the tensile strength, the bending modulus of elasticity, and the degradability (in 60° C. water) were measured. The measurement results are shown in Table 3 together with the content of the carboxylic acid anhydride and the acrylic rubber core-shell polymer.

Working Example 9

Test pieces were prepared in the same manner as in Working Example 8 with the exception that 5 parts by mass of BTDA (equivalent to 5.2 parts by mass per 100 parts by mass of PGA1) was blended as a carboxylic acid anhydride, and the impact strength (notched), the tensile strength, the bending modulus of elasticity, and the degradability (in 60° C. water) were measured. The measurement results are shown in Table 3 together with the content of the carboxylic acid anhydride and the acrylic rubber core-shell polymer.

Comparative Example 5

Test pieces were prepared in the same manner as in Working Example 8 with the exception that a carboxylic acid anhydride was not blended, and the impact strength (notched), the tensile strength, the bending modulus of elasticity, and the degradability (in 60° C. water) were measured. The measurement results are shown in Table 2 together with the content of the acrylic rubber core-shell polymer.

TABLE 3

| | Aliphatic polyester resin | | Carboxylic acid anhydride | | Acrylic rubber core-shell polymer | | Impact strength (notched) J/m | Tensile strength MPa | Bending modulus of elasticity MPa | Degradability (in 60° C. water) | |
|---|---|---|---|---|---|---|---|---|---|---|---|
| | | (part by mass) | (part by mass) | per PGA100 | (part by mass) | Per PGA100 | | | | Rate of decrease in thickness mm/hr | Degradation lead time Hours |
| Working Example 8 | PGA1 | 96 | 3 | 3.1 | 4 | 4.2 | 57 | 114 | 6688 | 0.0294 | 6.4 |
| Working Example 9 | PGA1 | 96 | 5 | 5.2 | 4 | 4.2 | 54 | 117 | 6658 | 0.0398 | 4.1 |
| Comparative Example 5 | PGA1 | 96 | 0 | 0 | 4 | 4.2 | 77 | 115 | 6805 | 0.0202 | 50.0 |

It was found from Table 3 that the molded products having an effective thickness of 1 mm or more in Working Examples 8 and 9, which were molded products having an effective thickness of 1 mm or more and were formed from an aliphatic polyester resin composition containing from 1 to 30 parts by mass of a carboxylic acid anhydride and further containing from 1 to 50 parts by mass of an acrylic rubber core-shell polymer per 100 parts by mass of an aliphatic polyester resin containing not less than 50 mass % of a PGA, yielded the following results: the degradation lead time when the molded product was immersed in water at a temperature of 60° C. was not more than 40 hours, and was specifically not more than 15 hours; the rate of decrease in thickness was also not less than 0.02 mm/hr, and was specifically not less than 0.025 mm/hr, indicating that the degradability was dramatically improved in comparison to Comparative Example 5, which did not contain a carboxylic acid anhydride, and it was thereby confirmed that the molded products had even better degradability and outstanding initial degradability, in particular, even in relatively low-temperature downhole environments such as a temperature of lower than 66° C., for example, so as to be degradable in a desired short amount of time; the izod impact strength (notched) was 57 J/m or 54 J/m, indicating that the molded products had an impact resistance that did not cause a problem from a practical standpoint in comparison to Comparative Example 5; the tensile strength was 114 MPa or 117 MPa, which did not differ from Comparative Example 5; and the bending modulus of elasticity was 6,688 MPa or 6,658 MPa, which indicated that sufficient mechanical properties from a practical standpoint were maintained with good balance.

In contrast, it was found that although the molded product having an effective thickness of 1 mm or more in Comparative Example 5, which was formed from an aliphatic polyester resin composition containing an acrylic rubber core-shell polymer but not containing a carboxylic acid anhydride, had balanced mechanical properties, the degradation lead time when the molded product was immersed in water at a temperature of 60° C. exceeded 40 hours. Therefore, it was found that the molded product having an effective thickness of 1 mm or more in Comparative Example 5, which was formed from an aliphatic polyester resin composition, did not have excellent degradability in relatively low-temperature downhole environments such as a temperature of lower than 66° C., for example, and cannot be degraded in a desired short amount of time.

INDUSTRIAL APPLICABILITY

The present invention provides a molded product having an effective thickness of 1 mm or more, the molded product being formed from an aliphatic polyester resin composition containing from 1 to 30 parts by mass of a carboxylic acid anhydride per 100 parts by mass of an aliphatic polyester resin containing not less than 50 mass % of a polyglycolic acid resin, the effective thickness being 1 mm or more. Due to these features, the present invention can provide a molded product containing an aliphatic polyester resin, which is a degradable material, and having an effective thickness of 1 mm or more. Therefore, the molded product of the present invention has excellent degradability even in relatively low-temperature downhole environments such as a temperature of lower than 66° C., for example, can be degraded in a desired short amount of time, and has sufficient mechanical strength, which yields high industrial applicability.

In addition, by providing a downhole tool member for hydrocarbon resource recovery formed from the aforementioned molded product having an effective thickness of 1 mm or more, the present invention can provide a downhole tool member for hydrocarbon resource recovery having excellent degradability even in relatively low-temperature downhole environments such as a temperature of lower than 66° C., for example, so as to be degradable in a desired short amount of time, and having sufficient mechanical strength, which yields high industrial applicability.

Furthermore, by providing an aliphatic polyester resin composition for the aforementioned downhole tool member for hydrocarbon resource recovery containing from 1 to 30 parts by mass of a carboxylic acid anhydride per 100 parts by mass of an aliphatic polyester resin containing not less than 50 mass % of a polyglycolic acid resin, the present invention can provide an aliphatic polyester resin composition for a downhole tool member for hydrocarbon resource recovery having excellent degradability even in relatively low-temperature downhole environments such as a temperature of lower than 66° C., for example, so as to be degradable in a desired short amount of time, which yields high industrial applicability. In addition, by providing a well drilling method of performing well treatment using the aforementioned downhole tool member for hydrocarbon resource recovery, and degrading the downhole tool member for hydrocarbon resource recovery, the downhole tool member is formed from a molded product having sufficient mechanical strength, so well treatment such as fracturing can be performed reliably, and the molded product has excellent degradability even in relatively low-temperature downhole environments such as a temperature of lower than 66° C. and can be degraded in a desired short amount of time. The present invention can therefore provide an efficient and economical well drilling method, which yields high industrial applicability.

The invention claimed is:

1. A downhole tool member for hydrocarbon resource recovery comprising a molded product;
   wherein the molded product is formed from an aliphatic polyester resin composition containing an aliphatic polyester resin containing not less than 50 mass % of a polyglycolic acid resin and from 1 to 30 parts by mass of a carboxylic acid anhydride per 100 parts by mass of the aliphatic polyester resin,
   wherein an effective thickness of the molded product is 1 mm to 1,000 mm, and
   wherein the carboxylic acid anhydride is at least one selected from the group consisting of an aliphatic monocarboxylic acid anhydride, an aromatic dicarboxylic acid anhydride, an aromatic tricarboxylic acid anhydride, an alicyclic dicarboxylic acid anhydride, an aliphatic tetracarboxylic dianhydride, and an aromatic tetracarboxylic dianhydride.

2. The downhole tool member for hydrocarbon resource recovery according to claim 1, wherein the downhole tool member is at least one selected from the group consisting of an annular member, a ball, a ball seat, and a screw.

* * * * *